June 10, 1930.   A. J. MAY   1,763,245
ELECTRIC CIRCUIT CONTROL MEANS
Original Filed Nov. 20, 1925   3 Sheets-Sheet 1

INVENTOR
Adam J. May
BY
his ATTORNEYS

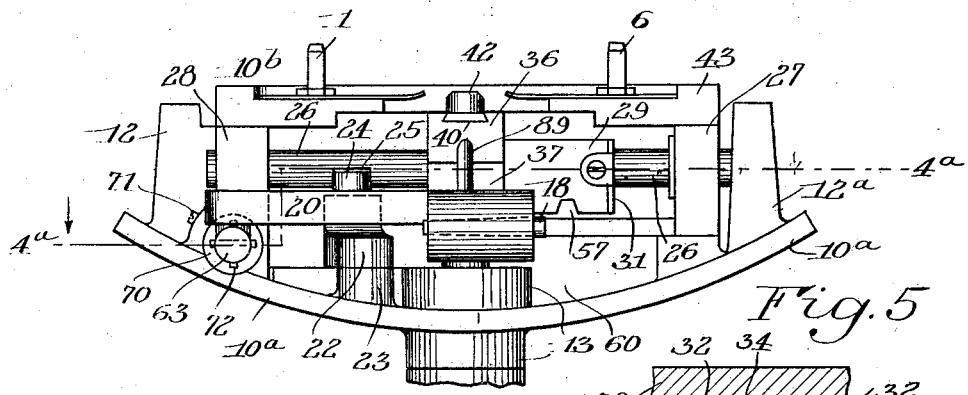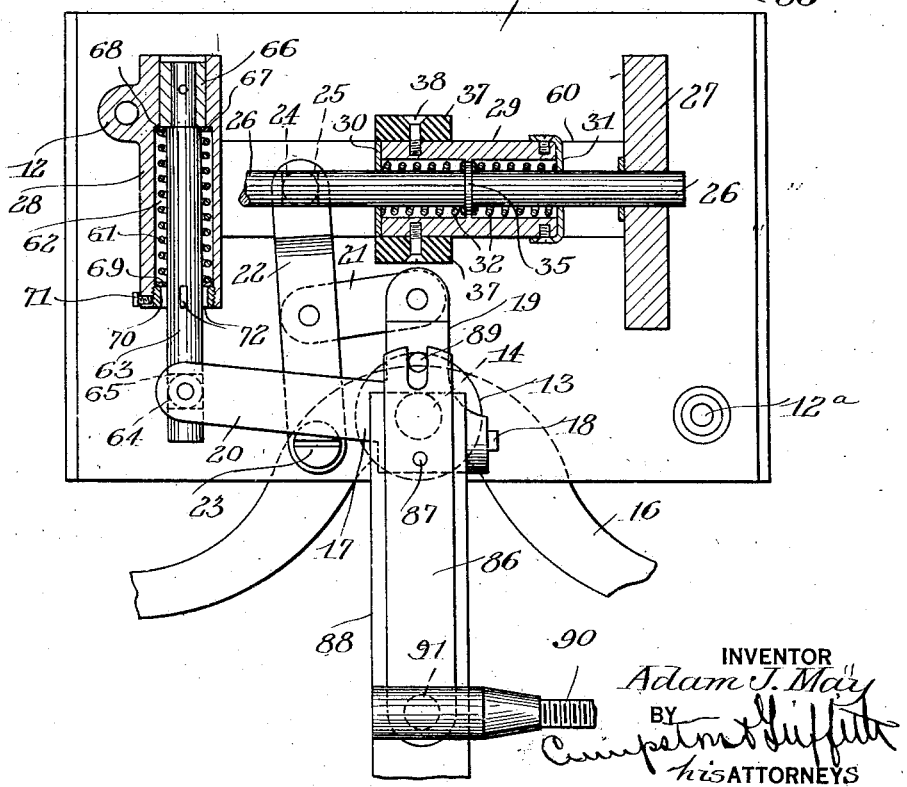

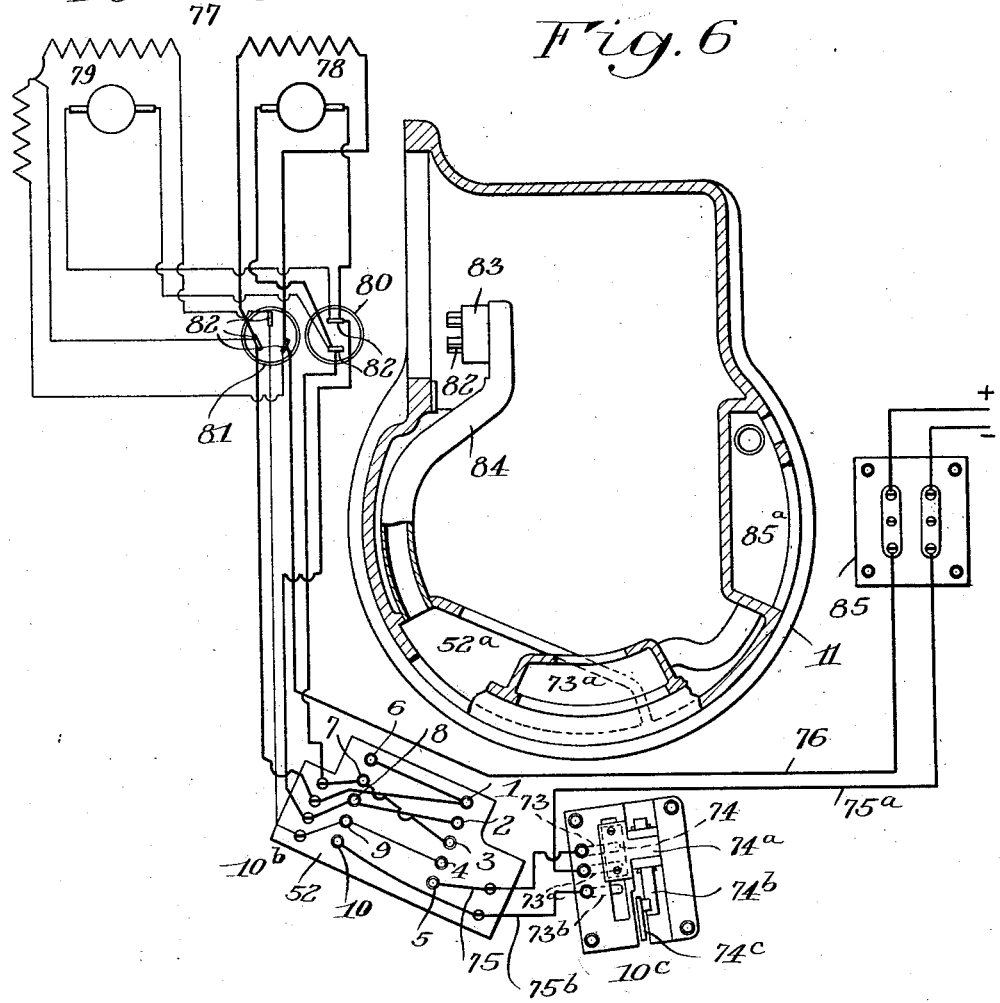

Patented June 10, 1930

1,763,245

UNITED STATES PATENT OFFICE

ADAM J. MAY, OF ROCHESTER, NEW YORK, ASSIGNOR, BY MESNE ASSIGNMENTS, TO RITTER DENTAL MANUFACTURING COMPANY, INC., OF ROCHESTER, NEW YORK, A CORPORATION OF DELAWARE

ELECTRIC-CIRCUIT-CONTROL MEANS

Original application filed November 20, 1925, Serial No. 70,241. Divided and this application filed August 14, 1926. Serial No. 129,273.

The present invention relates to electric circuit control means and has for one object to provide improved means of this class including combined switch mechanisms for controlling electric circuits, and particularly for controlling and starting and stopping of electric motors and the automatic control of parts driven by the same.

A further object of the invention is to provide an improved motor control switch in combination with an operating portion of the latter adapted upon opening and closing the switch to effect operation of a work performing element, such for example as a brake control device which may be employed to check the speed of the motor.

A further object of the invention is to provide an improved electric switch having yieldable means adapted to be compressed upon initial operation of the switch whereby to store up energy which will afford an extremely quick movement of the adjustable contacts of the switch in order to prevent arcing either upon opening or closing of the circuit.

A further object of the invention is to provide improved circuit control means for reversible electric motors, including a manually controled reversing switch and a limit switch connected therewith and arranged to be controlled by a movable part driven by the motor.

To these and other ends the invention resides in certain improvements and combination of parts, all as will be hereinafter more fully described, the novel features being pointed out in the claims at the end of the specification.

In the drawings:

Figure 3 is a bottom plan view of the switch;

Figure 4 is a sectional elevation taken on line $4^a$—$4^a$ of Figure 3;

Figure 5 is an enlarged detail section through one of the spring housings for the switch shown in Figure 4; and Figure 6 is a diagrammatic view illustrating the circuit arrangement of an A. C. and D. C. motor in connection with a part sectional plan of an extensible chair base and showing the manner of connecting the present switch with the motor and with a limit switch controlled by one of the movable sections of the chair.

The invention disclosed herein embodies an improved electric circuit control mechanism, the present application being a division of my copending application for extensible chairs filed November 20, 1925, Serial No. 70,241. The invention contemplates the provision of a manually controlled electric switch and an automatic limit switch connected thereto and adapted for control by a movable part as for example an extensible chair section, not shown, arranged to be actuated in opposite directions by suitable power means such as a reversible electric motor as illustrated in my copending application referred to above.

The invention further contemplates the provision of a manually controlled switch embodying new and novel features of construction, and one of the type which is particularly adapted for use with a reversible electric motor, as shown in Figure 6 of the drawings.

Figure 2:
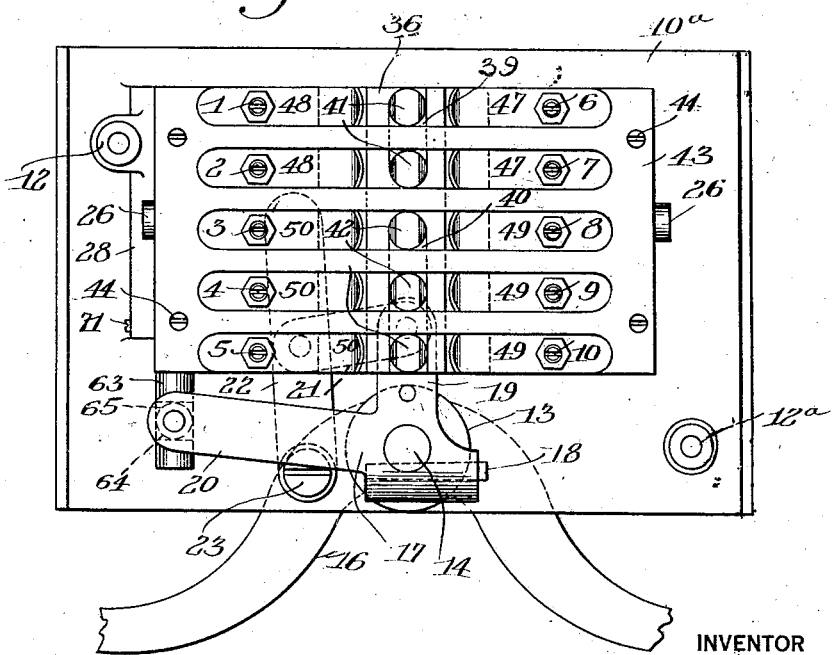
Figure 2 is an elevation of the same as viewed from the upper side of Figure 1.

Referring to the drawings $10^a$ represents a suitable frame or bracket upon which the switch indicated generally at $10^b$ is mounted. The bracket in the present instance comprises a circular base plate adapted for attachment to a cylindrical chair base 11 as shown for example in Figure 6 and in my copending application referred to above. The bracket carries laterally projecting lugs 12 and $12^a$ at its opposite ends which have openings therethrough for the reception of bolts or screws by which the bracket may be attached to the chair base. The bracket is provided with a bearing 13 in which is journaled a pivot bolt 14. Secured upon the outer end of the bolt is an operating member 16 preferably in the form of a switch pedal having oppositely extending arm portions as shown in Figures 2 and 4. Secured upon the pivot bolt on the inside of the bracket is a bell crank lever 17 held rigid upon the bolt by a key 18, the lever having angularly disposed arms 19 and 20 as shown in Figure 2.

Figure 1:
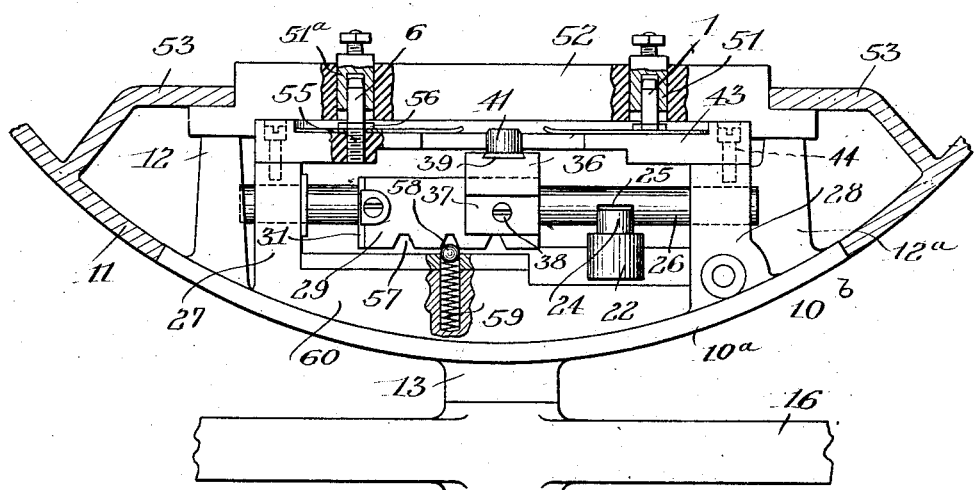
Figure 1 is a top plan view partly in section of a switch embodying the invention.

The arm 19 is connected through a link 21 with an upstanding lever 22 pivoted at 23 to the switch plate 10$^a$ as shown in Figures 2 and 4. The upper end of the lever is provided with a roller 24 operable in a slot 25 formed in a plunger or switch actuating rod 26 which is guided at its opposite ends in supports 27 and 28 carried by the bracket 10$^a$. The rod extends through a housing 29 and the end closures 30 and 31 therefor, against which the outer ends of a pair of springs 32 are seated as shown in Figure 4. The inner ends of the springs engage adjacently mounted follower plates 33 which normally rest upon an inwardly projecting annular flange or shoulder 34 within the housing which is preferably formed integral therewith. The rod 26 carries a collar 35 rigid thereon which lies between the follower plates 33 as shown in Figure 5. From this construction it will be seen that the housing 29 may be moved in either direction merely by moving the pedal or operating member 16 to operate the bell crank 17 and through it the link 21 and lever 22. The housing carries a transversely extending bar 36 constructed of insulating material and having downwardly extending projections 37 at the opposite sides of its center adapted to engage the sides of the housing, to which they are connected by the screws 38. The bar 36 carries two separate plates 39 and 40, the former having two upstanding contact members 41 and the latter three similar contact members 42. Adjacent the switch operating plunger 26 is a plate of insulating material 43 having its ends disposed upon the laterally extending lugs 27 and 28 of the bracket 10$^a$ to which it is secured by the screws 44 as shown in Figures 1 and 2. The plate 43 is recessed to receive a plurality of fixed contact members on the opposite sides of the switch bar 36 carrying the movable contacts 41 and 42. The fixed contact members adapted for cooperation with the movable contacts 41 are indicated two at 47 on one side of the movable contact and two at 48 on the other side thereof. The fixed contacts adapted for cooperation with the movable contacts 42 are indicated, three at 49 and the opposite three at 50, all being shown in Figure 2. The fixed contacts 48 and 50 carry a series of plugs 1 to 5 inclusive while the fixed contacts 47 and 49 carry a series of plugs 6 to 10 inclusive, all adapted to take into correspondingly arranged socket members 51 and 51$^a$ carried by a switch plate 52 of suitable insulating material which is connected, in the present instance, in any suitable manner to oppositely extending plate portions 53 of the chair base 11 shown in Figures 1 and 6 and also in my copending application referred to above. The plugs 1 to 10 inclusive are each preferably threaded into the insulating plate 43 as indicated at 55 in Figure 1 and are provided with nuts 56 serving to clamp the contact fingers upon said plate.

The spring housing 29 is provided at one side with three notches, indicated at 57, each of which is adapted to receive a ball 58 arranged to frictionally engage the housing within the notches to hold said housing in its different positions of adjustment under the pressure of a spring 59 mounted in a recess formed in an upstanding lug 60 on the bracket 10$^a$ between the lugs 27 and 28.

As a means for building up pressure during movement of the pedal in either direction by the operator whereby to afford a quick make and break between the movable and fixed contacts of the switch to prevent arcing and the consequent burning of the parts, I provide a relatively strong spring 61 of a capacity greater than that of both springs 32, each of which acts to afford the desired quick release under conditions which will be subsequently described. The spring 61 is preferably mounted within a bore or recess 62 formed in the base of the lugs 28, as indicated in Figures 3 and 4. Extending through the spring and into the bore is an operating stem 63 suitably connected with the arm 20 of the bell crank 17 as by means of a roller 64 on the latter disposed within a recess 65 formed in the lower end of the stem 63. The stem at its upper end is provided with a head 66 engaging a follower 67 disposed within the bore 62, the follower being free to move inwardly but being held against outward movement by a shoulder 68 formed as indicated in Figure 4. At the opposite end of the bore is provided a second follower 69, normally resting upon a holder 70 in the form of a ring screwed into the lower end of the lug 28, and held against displacement by a set screw 71. The stem 63 is provided with lateral projections 72 operable through the ring and adapted to engage the follower 69 to move it against the action of the spring 61. Thus, it will be seen that the spring 61 is compressed by depression of the pedal in either direction so that pressure is stored up for returning the switch to normal inoperative position at the moment the pedal is released. Upon releasing the switch from either of its closing positions the action of the spring 61 is such as to afford a quick movement of the bell-crank 17 which, through the connections provided, will operate the plunger 26 to compress one or the other of the springs 32 against the resistance of the spring-pressed ball 58, in frictional engagement with the housing 29. Considerable pressure is required for the springs 32 to overcome the resistance of the ball and therefore the housing 29 and the movable contacts will remain inactive until the resistance of the spring-pressed ball is overcome, at which time quick action will be afforded by one or the other of the springs 32 in returning the housing and movable contacts to central position as indicated in Figure 1. The same action of course takes place when moving the pedal to close the switch so that a slow movement of the two sets of contacts 41 and 42 is avoided when they are thrown either into or out of engagement with the yieldable finger contacts.

The limit or automatic control switch 10ᶜ is adapted to be actuated by a movable part such as one of the adjustable sections of the chair in its up and down movements as indicated and described in my copending application referred to above. Briefly the limit switch 10ᶜ is provided with three fixed contacts 73, 73ᵃ and 73ᵇ which lie within the path of a movable contact 74 carried by a slide 74ᵃ having an operating stem 74ᵇ arranged to be actuated by a lever 74ᶜ adapted to be moved in opposite directions by one of the extensible sections of the chair when moved up and down by the motor. The limit switch therefore has three different operating positions corresponding to different positions of the control section of the chair, not shown. Leading from the contacts 73, 73ᵃ and 73ᵇ are wires 75, 75ᵃ and 75ᵇ respectively. The wire 75 leads to the socket for the plug 5 of the switch plate 52 and the opposite wire 75ᵇ to socket for plug 10, each of said wires being adapted in conjunction with wires 75ᵃ and 76 to complete the circuit of the motor, indicated generally at 77 when the starting switch is moved to closed position.

The A. C. and D. C. motors are indicated diagrammatically at 78 and 79 respectively. Each of the motors is preferably provided with two plug and socket connections 80 and 81 which may be combined in a single connection if desired. The sockets are preferably carried by the motors, and the fingers 82 which take into the sockets are adapted to project from a holder 83 on the free end of a conduit 84 through which the circuit connections extend to the switch plate 52 which is adapted to be removably disposed in the pocket 52ᵃ in the chair base 11.

In Figure 6 the heavy lines indicate a closed or active circuit through the A. C. motor while the light lines indicate in part the circuit arrangement for the D. C. motor, certain of the wires being common to both circuits. The circuit for the A. C. motor is shown closed through the limit switch 10ᶜ with the latter in the position shown in Figure 6. The limit switch is adapted to be removably disposed in a pocket 73ᵃ of the chair base 11.

A line switch 85 with which the wires 75ᵃ and 76 are connected is adapted to be disposed in a pocket 85ᵃ of the chair base.

As indicated in Figure 6 certain of the sockets at one side of the switch are shown connected with certain of those at the opposite side, it being understood that the arrangement is such as to afford reversal of the motor from either operating position regardless of whether an A. C. or D. C. motor is employed. With the wiring arrangement shown the several circuits can be easily traced for the two types of motors with the switch in either closing position. In this connection, it will be understood that with the movable contact 74 of the limit switch in central position the motor will become operative upon moving the starting switch to either of its closing positions regardless of the type of motor used. However, with the limit switch in the position indicated in Figure 6 the circuit through the main or starting switch can only be closed when the movable contacts 41 and 42 of the latter are adjusted to engage the fixed contacts 48 and 50, effected by depressing the left side of the pedal 16 as viewed in Figure 1. The fixed contacts 48 and 50 engage the plugs 1 to 5 which take into a series of correspondingly arranged sockets 51 formed in the right side of the switch plate 52 while the opposite plugs 6 to 10 inclusive take into a set of correspondingly arranged sockets 51ᵃ formed in the left side of the said plate. With the limit switch in the extreme reverse position from that shown in Figure 6 the motor circuit can be closed and the motor reversed by depressing the right side of the pedal as viewed in Figure 1 to shift the movable contacts 41 and 42 into engagement with the fixed contacts 47 and 49. In the first named position of the switches the motor will operate to raise the chair, while in the last named position it will operate to lower the same.

Operatively associated with the pedal 16 and bell crank lever 17 is a lever 86 pivoted at 87 upon a bracket 88 which may be connected with the chair base in any suitable manner. The lever 86 is slotted at its upper end to receive an operating pin or projection 89 which extends laterally from the arm 19 of the bell crank 17 as shown in Figures 3 and 4. A link or rod 90 is connected with the lower end of the lever 86 preferably by a ball and socket connection 91 of a well known construction. The lever 86 and link 90 will be automatically actuated by movement of the pedal 16 in either direction which moves the bell crank 17 and pin 89 whenever the pedal is depressed. The lever 86 and link 90 constitute work performing elements which may be employed for different purposes, one example of which is illustrated in my copending application referred to above, wherein said parts are employed to effect application and release of a brake for the motor by which the chair sections are raised and lowered.

I claim as my invention:

1. An electric circuit control switch comprising a support, a holder mounted for movement in opposite directions thereon and provided with spaced contacts, separate sets of fixed contacts on each side of the holder the contacts of each set being adapted upon movement of the holder to predetermined positions to be connected by one of the contacts of said holder, separate connections between certain contacts of each set on one side of the holder and certain contacts of another set on the opposite side of the holder and operating means for the holder effective to afford a relatively quick make and break between the movable and fixed contacts, and said operating means upon movement thereof being actuated independently of the circuit controlled by the switch.

2. An electric circuit control switch comprising a support, a holder mounted for movement in opposite directions thereon and having two sets of contacts normally independent of all current conductors, separate sets of fixed contacts disposed in parallel relation on each side of the holder normally spaced from the contacts of the holder and adapted upon movement of the holder to predetermined positions to be engaged by the contacts thereof, operating means for the holder effective to afford a relatively quick make and break between the movable and fixed contacts, and means for automatically returning the holder to normal position from either circuit closing position upon release of the operating means.

3. An electric switch comprising a support, a holder mounted for movement in opposite directions thereon and having a contact movable therewith, fixed contacts carried by the support at opposite sides of the normal position of the holder, actuating means for moving the holder to its different positions to cause the contact thereon to engage said fixed contacts, spaced abutments upon the support, a spring having its opposite ends engaging said abutments, a plunger connected with the actuating means arranged for operation thereby to condition the spring for the return of the plunger and actuating means to normal position subsequent to the movement of the holder to each circuit closing position.

4. A switch comprising a support, an actuating member slidably mounted upon the support and having an abutment thereon, a holder mounted for movement relative to the actuating member and having transverse end portions, a pair of springs operatively associated with the holder having their outer ends engaging said end portions and their inner ends disposed in the path of the abutment whereby upon movement of said actuating member in opposite directions one or other of the springs will be compressed, means adapted to afford a limited degree of resistance to movement of the holder in either direction under compression of the springs, a fixed contact, a contact carried by and movable with the holder normally spaced from the fixed contact and adapted to have a relatively quick make and break connection with the fixed contact upon movement of the holder by said springs, said holder being operated solely by the action of the springs and operating means for moving the actuating member in opposite directions.

5. A switch comprising a support, an actuating member slidably mounted upon the support and having an abutment thereon, a holder mounted for movement relative to the actuating member, a pair of springs operatively associated with the holder having their outer ends seated upon the holder and inner ends disposed in the path of the abutment whereby upon movement of said actuating member in opposite directions one or other of the springs will be compressed, means adapted to afford a limited degree of resistance to movement of the holder in either direction under compression of the springs, a fixed contact, a contact carried by and movable with the holder normally spaced from the fixed contact and adapted to have a relatively quick make and break connection with the fixed contact upon movement of the holder by said springs, a lever pivoted upon the support and operatively connected with said actuating member, means for moving the lever in opposite directions and means for automatically returning the lever and last mentioned means from operating position to normal position upon release of said parts.

6. A switch comprising a support, an actuating member slidably mounted upon the support and having an abutment thereon, a holder mounted for movement relative to the actuating member, a pair of springs operatively associated with the holder having their outer ends seated upon the holder and inner ends disposed in the path of the abutment whereby upon movement of said actuating member in opposite directions one or other of the springs will be compressed, means adapted to afford a limited degree of resistance to movement of the holder in either direction under compression of the springs, a fixed contact, a contact carried by and movable with the holder adapted to have a relatively quick make and break connection with the fixed contact upon movement of the holder by said springs, a lever pivoted upon the support and operatively engaging the actuating member, a second lever pivoted upon the support, a link connecting said levers and manually operable means for moving the second mentioned lever in opposite directions.

7. A switch comprising a support, an actuating member slidably mounted upon the support and having an abutment thereon, a holder mounted for movement relative to the actuating member, a pair of springs operatively associated with the holder having their inner ends disposed in the path of the abutment whereby upon movement of said actuating member in opposite directions one or other of the springs will be compressed, means adapted to afford a limited degree of resistance to movement of the holder in either direction under compression of the springs, a fixed contact, a contact carried by and movable with the holder adapted to have a relatively quick make and break connection with the fixed contact upon movement of the holder by said springs, operating means for moving the actuating member in opposite directions, including a bell-crank lever, a spring, supporting means for the spring adapted to resist movement thereof in opposite directions, and means connected with said bell crank lever adapted upon movement of the latter in either direction to effect compression of the spring whereby to return said operating means to normal position upon release of the same.

8. An electric switch comprising a support, a housing mounted thereon for movement toward and from circuit closing position and having a contact movable therewith, a fixed contact in the path of the movable contact normally spaced from said movable contact, yieldable means adapted to afford a limited degree of resistance to movement of the housing in either direction, yieldable driving elements within the housing the outer ends of which are seated upon abutments formed on the ends of the housing, said elements being adapted under a predetermined degree of compression to overcome the resistance of said yieldable means whereby to effect a relatively quick make and break between said movable and fixed contacts, and actuating means for said yieldable elements comprising relatively movable parts one of which has an operating portion disposed between the inner ends of said elements.

9. An electric switch comprising a support, a housing mounted thereon for movement toward and from circuit closing position and having a contact movable therewith, a fixed contact in the path of the movable contact, yieldable means adapted to afford a limited degree of resistance to movement of the housing in either direction, driving means within the housing adapted when the latter is moved a predetermined distance toward or from circuit closing position to overcome the resistance of said yieldable means whereby to effect a relatively quick make and break between said movable and fixed contacts, manually operable actuating means for moving the housing toward and from circuit closing position, and yieldable means conditioned by movement of the actuating means in either direction to effect automatic movement of the housing in an opposite direction upon release of the actuating means.

10. An electric switch comprising a support, a housing adjustably mounted thereon for movement in opposite directions, a contact movable with the housing, a fixed contact in the path of the movable contact normally spaced from said movable contact, springs within the housing each having its opposite ends supported thereby, an operating member within the housing having a portion interposed between the inner ends of the springs whereby it will separately compress each when moved in the direction thereof, means adapted to afford a limited degree of resistance to movement of the housing in either direction, and actuating means movable in opposite directions to effect movement of the operating member in both directions, said springs being adapted when the housing is moved predetermined distances to separately overcome said resisting means whereby to afford a relatively quick make and break between the movable and fixed contacts.

11. An electric switch comprising a support, a housing adjustably mounted thereon for movement in opposite directions, a contact movable with the housing, a fixed contact in the path of the movable contact, springs within the housing each having its opposite ends supported thereby, an operating member within the housing having a portion interposed between the inner ends of the springs whereby to separately compress each against the resistance of the end walls of the housing when moving said member in opposite directions, means adapted to afford a limited degree of resistance to movement of the housing in either direction, actuating means movable in opposite directions to effect movement of the operating member in both directions, said springs being adapted when the housing is moved a predetermined distance to separately overcome said resisting means whereby to afford a relatively quick make and break between the movable and fixed contacts and a yieldable member arranged to return said actuating means to normal position upon release of the same.

12. An electric switch comprising a support, a holder mounted for movement in opposite directions upon the support and having spaced abutments thereon with an intermediate abutment between said spaced abutments, a pair of springs having their outer ends supported by said spaced abutments and their inner ends normally supported by said intermediate abutment, an operating device having a portion disposed between the inner ends of the springs and adapted when moved in one direction to compress one of the springs and when moved in the opposite direction to compress the other of said springs, a contact movable with the holder, a fixed contact at each side of the movable contact adapted to be engaged by the latter upon movement of the holder to predetermined positions, said movable contact being normally spaced from the fixed contacts and means affording a limited degree of resistance at predetermined points in the movement of the holder to and from said positions from which points said springs are adapted to afford a relatively quick movement of the holder whereby to prevent arcing upon shifting of the movable contact to open and closed positions.

13. An electric switch comprising a support, a holder mounted for movement in opposite directions to different circuit closing positions and having a contact movable therewith, separate sets of fixed contacts mounted upon the support on opposite sides of the holder in the path of the movable contact and normally spaced therefrom, actuating means for moving the holder to effect engagement of the movable contact with each set of said fixed contacts, a spring carried by the support, and means associated with said actuating means adapted to compress the spring upon movement of the holder to each circuit closing position whereby upon release of the actuating means the holder will be automatically returned to normal position.

14. An electric switch comprising a support, an adjustable holder reciprocably mounted thereon and provided with a contact, a fixed contact in the path of the adjustable contact, spring-pressed member adapted to frictionally resist movement of the holder to and from circuit closing position, yieldable driving means for the holder adapted upon movement to a predetermined point in either direction to overcome the resistance of said spring-pressed member and to effect a relatively quick movement of the holder, manually operable means for moving the driving means in one direction, a plunger connected with said manually operable means and a spring adapted to be compressed by the plunger upon movement of the latter in either direction, the spring upon release of the operating means serving to return the same to normal inoperative position.

15. An electric switch comprising a support, a fixed contact upon the support, a holder reciprocably mounted upon the support having a contact movable therewith, spring-pressed means adapted to frictionally resist movement of the holder to and from circuit closing positions, yieldable driving means for the holder adapted during operation in either direction to overcome the resistance of said spring-pressed means whereby to afford a relatively quick movement of the second mentioned contact to and from engagement with the fixed contact, a bell-crank mounted upon the support, a lever operatively connected with said driving means, a link connecting the lever with one arm of the bell-crank, a manually operable member for moving the bell-crank and yieldable means connected with the other arm of the bell-crank adapted to return the holder to normal inoperative position upon release of said manually operable member.

16. An electric switch comprising a support, spaced contacts upon the support, a holder reciprocably mounted upon the support and normally disposed at a non-circuit closing position between said contacts, spring-pressed means adapted to frictionally resist movement of the holder from either open or circuit closing position, a contact carried by the holder, operating means for moving the holder to and from engagement with either of said contacts including springs each adapted to overcome said spring-pressed means when moved in opposite directions whereby to effect a relatively quick movement of the second mentioned contact to and from each closing position, a lever connected with the operating means, manually controlled means for moving the lever in opposite directions and yieldable means operatively associated with said manually controlled means for returning the latter to normal inoperative position upon release of the same.

17. An electric switch mechanism, a support, an adjustable holder mounted thereon and provided with a contact, a fixed contact in the path of the adjustable contact, means adapted to afford a limited degree of resistance to the movement of the holder, yieldable driving means for the holder adapted to overcome said resisting means and to effect a relatively quick movement of the first mentioned contact into engagement with said fixed contact, manually operable actuating means for said driving means, a lever arranged to be operated by said actuating means and adapted for connection with a brake and yieldable means for returning the actuating means and said brake actuating lever to normal position.

18. A switch for a reversible electric motor, comprising a support, a series of contacts thereon, a second series of contacts upon the support, each series including two sets of contacts one for one set of connections to the motor and the other for the opposite set, an element normally positioned between the contacts of the two series and movable to an operating position with respect to each, a pair of spaced contact members on said element one for establishing connection between the contacts of one set of each series and the other for connecting the contacts of the other set of each series when said element is moved to said operating positions, connections extending from certain contacts of the sets of one series to certain contacts of the sets of the other series so arranged as to cooperate in effecting the closing and reversal of the motor circuits when said element is moved from one operating position to another and operating means for said element including means arranged to effect a relatively quick movement thereof to and from each circuit closing position.

19. A switch for controlling the circuits of a combined direct and alternating current reversible motor having common circuit connections, said switch comprising a support, a series of contacts thereon, a second series of contacts carried by the support, each series including a plurality of spaced contacts for the motor circuit connections and an element normally occupying an inoperative position between the contacts of the two series and movable to an operative position with respect to each, spaced contacts upon said element each arranged to connect different contacts of each series in the different positions of said element whereby to close the motor circuits to effect operation of the motor in reverse directions, and means for moving said element from said inoperative to either operating positions.

ADAM J. MAY.